(12) United States Patent
Krulik

(10) Patent No.: US 6,723,246 B2
(45) Date of Patent: Apr. 20, 2004

(54) FILTER CLEANING METHOD

(75) Inventor: Gerald A. Krulik, San Clemente, CA (US)

(73) Assignee: Ionics, Incorporated, Watertown, MA (US)

( * ) Notice: Subject to any disclaimer, the term of this patent is extended or adjusted under 35 U.S.C. 154(b) by 0 days.

(21) Appl. No.: 09/960,613

(22) Filed: Sep. 21, 2001

(65) Prior Publication Data

US 2002/0121483 A1 Sep. 5, 2002

Related U.S. Application Data

(60) Provisional application No. 60/235,783, filed on Sep. 26, 2000.

(51) Int. Cl.[7] ................................................ C02F 1/52
(52) U.S. Cl. .................... 210/636; 134/22.19; 210/638; 210/639; 210/651; 210/699; 210/701; 210/710; 210/721; 210/798
(58) Field of Search ................................ 210/636, 638, 210/639, 651, 710, 725, 727, 728, 696, 698, 699, 701, 749, 797, 798, 721, 758; 134/3, 22.14, 22.19, 42

(56) References Cited

U.S. PATENT DOCUMENTS

| | | | | |
|---|---|---|---|---|
| 4,386,005 A | * | 5/1983 | Kapiloff et al. ............. | 252/180 |
| 4,740,308 A | * | 4/1988 | Fremont et al. ............ | 210/632 |
| 4,895,658 A | * | 1/1990 | Amjad ........................ | 510/162 |
| 5,776,876 A | * | 7/1998 | Garris ........................ | 510/247 |
| 5,871,648 A | | 2/1999 | Allen et al. | |
| 5,904,853 A | | 5/1999 | Allen et al. | |
| 6,027,649 A | * | 2/2000 | Benedek et al. ............ | 210/639 |
| 6,180,056 B1 | * | 1/2001 | McNeel et al. ................ | 422/15 |
| 6,428,705 B1 | * | 8/2002 | Allen et al. .................. | 210/638 |

* cited by examiner

Primary Examiner—Peter A. Hruskoci

(57) ABSTRACT

A method of cleaning a filter clogged with flocculating materials is provided. The method comprises determining the flocculated materials clogged on the filter and adding a dispersing agent to break up said flocculated materials to form dispersed precipitates. Then the dispersed precipitates are removed from the filter in a regular cleaning such as backflushing.

15 Claims, 2 Drawing Sheets

FILTER CLEANING METHOD

PRIORITY DATA

This application claims the priority of U.S. provisional application Serial No. 60/235,783, filed Sep. 26, 2000, entitled "IMPROVED FILTER CLEANING METHOD", the disclosure of which is hereby incorporated by reference.

FIELD OF THE INVENTION

The present invention relates generally to wastewater treatment. More particularly, the present invention relates to methods of cleaning filters used in wastewater treatment by using dispersing agents to disperse the flocculated materials on the filters to automatically loosen any clogging materials and allow for easy removal.

BACKGROUND OF THE INVENTION

Filter cleaning is a tedious process when filters are clogged by flocculating materials. Especially, when filters are clogged by metal oxides particles, or a mixture of metal oxides and organic flocculating particles, filter cleaning can be very difficult. Prior art cleaning methods for mainly inorganic clogs include acid treatment at pH 2 or less. However, acid treatment methods often require over night soak of the clogged filters. Further, acid treatment alone is often not sufficient for organic flocculating clogs which are usually present with inorganic clogs. Other prior art filter cleaning methods used in wastewater treatment such as alkali treatment, oxidizer treatment, steam cleaning, high pressure liquid cleaning, and detergent washing are also subject to limitations and problems. These treatments require downtime of the filtration system, are costly, and do not address the root of the problem which is clogging by flocculating materials. Accordingly, there is a need for filter cleaning methods that can efficiently remove both organic and inorganic flocculating materials at same time and significantly reduce downtime of the filtration system.

SUMMARY OF THE INVENTION

Accordingly, it is an object of the present invention to provide a method of cleaning filters to significantly reduce downtime of the filtration system. It is another object of the present invention to provide a filter cleaning method wherein a dispersing agent can be used alone, or in combination with any other chemical solution to efficiently remove both organic and inorganic flocculated materials clogged on the filters.

In accordance with the present invention, there is provided a method of cleaning filters clogged with flocculated materials. The method comprises determining the nature of flocculated materials clogged on the filter and adding a dispersing agent to break up said flocculated materials to form dispersed precipitates. Then the dispersed precipitates are removed from the filter in a regular cleaning such as backflushing.

The present filter cleaning method can remove both inorganic and organic flocculated materials by using a dispersing agent. The dispersing agent used in the present invention comprises a derivative of polyacrylic acid or other suitable water soluble dispersant. Depending on the nature of the flocculated solid, the dispersing agent can be anionic or cationic or amphoteric. Preferably, the dispersing agent is selected from a group consisting of hydroxy-ethylidene diphosphonic acid, sodium diisopropylnaphthalenesulfonate and other water soluble dispersing agent.

The dispersing agent can be used at a concentration from about 10 to 100 ppm. The dispersing agent can be used alone, or in a mixture with an acid or oxide. The pH of the dispersing agent solution can be in a range from about 2 to 7.5.

BRIEF DESCRIPTION OF THE DRAWINGS

The foregoing and other objects of the invention will be more clearly understood from the following description when read in conjunction with the accompanying claims and drawings in which:

DETAILED DESCRIPTION OF THE INVENTION

Figure 1:
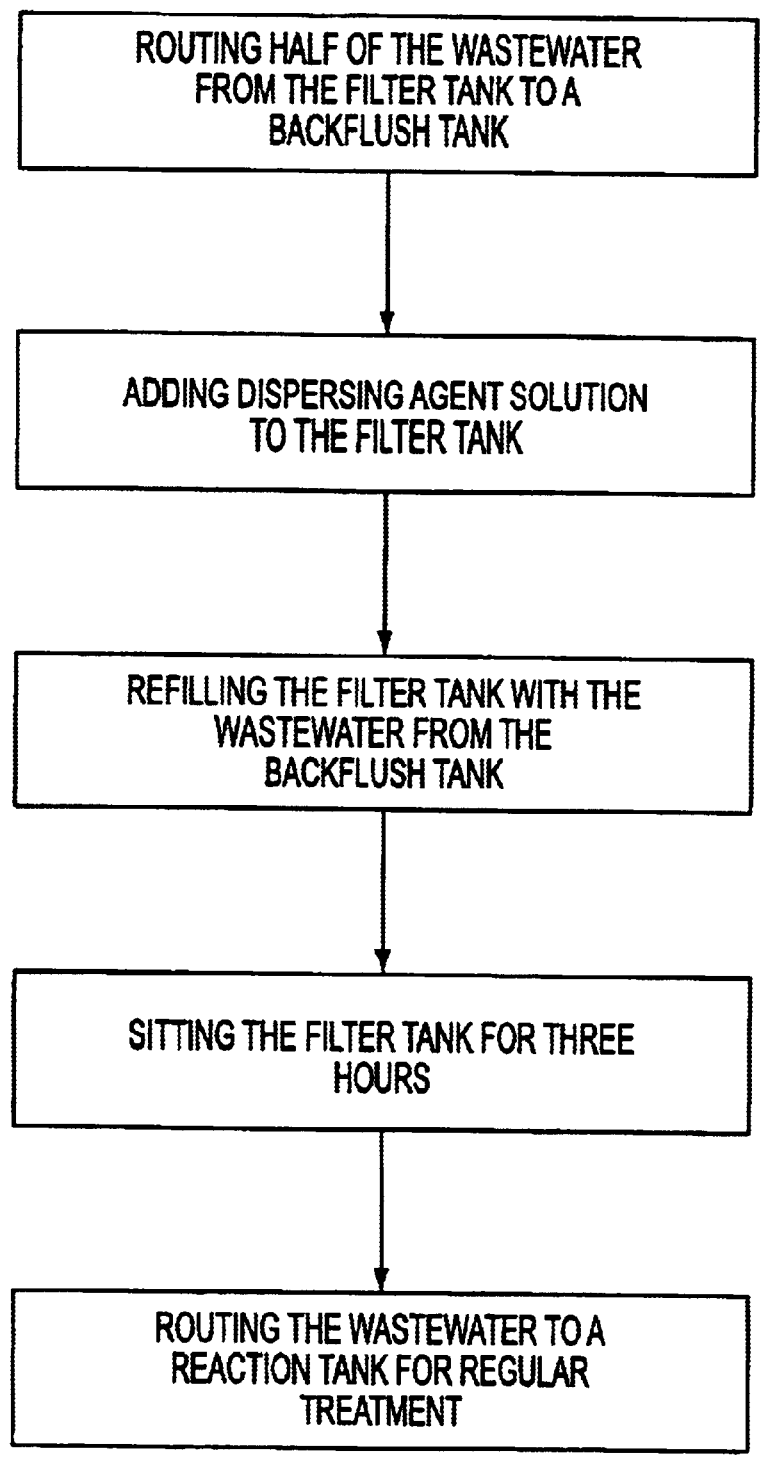
FIG. 1 is a flow chart illustrating the filter cleaning method of the present invention.

The present invention provides an improved method of cleaning filters used in wastewater treatment. In particular, the present method of cleaning filters comprises determining the nature of flocculated materials clogged on said filter and adding a dispersing agent that can break up the flocculated materials to form dispersed precipitates which automatically loosen from the filter. These dispersed precipitates can be then easily removed in a regular cleaning such as backflushing.

The present method of cleaning filters can be used to remove any flocculated materials clogged on the filter. These flocculated materials include organic and inorganic particles that are often produced in semiconductor wastewaters. In particular, the present method can remove organic materials such as surfactants, proprietary polymers, and biological compounds, photoresist processing residues, paint solids, plastics residues, dyes, laundry solids, textile residues, and inorganic materials such as ferric or iron oxides and hydroxides, aluminum and its oxides and hydroxides, calcium salts, silica and silicon, backgrind residues, metal particles, insoluble metal salts, phosphorus compounds, mining solids, CMP solids from semiconductor fabrication, glass processing solids, and the like. Semiconductor fabs are large users of chemical mechanical polishing (CMP) solutions. Other users include the glass industry, some metals polishing industries, etc. These CMP solutions are often colloidal or very small particle size suspensions of silica or alumina or cerium oxide or other abrasive. They may also contain oxidizer such as ferric nitrate or potassium iodate or hydrogen peroxide. They may also contain pH adjust agents such as ammonium hydroxide, sodium hydroxide, potassium hydroxide, organic acid; antitarnish agents such as carboxybenzotriazole; pad residues; silicon particles; metal particles such as tungsten, tantalum, copper, aluminum; arsenic and gallium arsenide; photoresist residues; organic and inorganic low-k layer residues, and the like.

The dispersing agent used in the present invention is selected based on the nature of the flocculated materials clogged on the filter. For instance, to remove iron hydroxide which is heavy orange floc from a filter, the dispersing agent can be a derivative of a polyacrylic acid or other suitable water soluble dispersant. Depending on the nature of the flocculated solid, the dispersing agent can be anionic or cationic or amphoteric. The dispersants used in the present invention include: sulfonated castor oil (Actrasol C-75 from Actachem L.P.); polyacrylic acid such as Accumer 9400 from Rohm and Haas Co; phosphino polycarboxylic acid such as Acusol 441 from Rohm and Haas Co; acrylic acid/maleic acid copolymer such as Acusol 448 from Rohm and Haas; disodium ethoxylated nonylphenol half ester of sulfosuccinic acid such as Aerosol A-103 from Cytec Industries; sodium dicyclohexyl sulfosuccinate such as Aerosol A-196 from Cytec; ethoxylated alkylguanidine amine complex such as Aerosol C-61 from Cytec; sodium isopropylnaphthalene sulfonate such as Aerosol OS from Cytec; tetrasodium N-(1,2-dicarboxyethyl)-N-octadecylate such as Aerosol 22 from Cytec; sodium polymethacrylate such as Alcosperse 104 from Alco Chemical; sodium polymethacrylate such as Alcosperse 124 from Alco; sodium salts of acrylic copolymers such as Alcosperse 157 from Alco; copolymer of acrylic acid and sulfonated monomer such as Alcosperse 240 from Alco; 2-amino-2-methyl-1-propanol such as AMP-95 from Angus Chemical Co; dimethyldicoco alkylammonium chloride such as Arquade 2C-75 from Akzo Nobel Chemicals Inc.; polyethylene glycols of various molecular weights such as carbowax peg series from Union Carbide Corp; ammonium polyacrylate such as Colloid 102 from Rhodia, Inc; sodium napthalene sulfonic acid formaldehyde such as Darvan 1 from RT Vanderbilt Co., Inc.; sodium salt of polymerized substituted benzoid alkyl sulfonic acids such as Darvan 2 from RT Vanderbilt; cationic proprietary electrolytes such as Daxad CP-2 from Hampshire Chemical Corp; alkoxylated linear alcohol such as Delonic LF-EP series from DeForest Enterprises; anionic liquid blends such as Densperse 250 from Graden Chemical Co; hydroxy-ethylidene diphosphonic acid such as Dequest 2010 from Solutia Inc; ethoxylated lauryl alcohol such as Dethox LA-4 from DeForest; ethoxylated oleic acid such as DeThox Acid O series from DeForest; polyaspartic acid homopolymer such as Donlar A-5D from Donlar Corp; modified sodium lignosulfonate such as Dynasperse A from Lignotech USA Inc; phosphate ester such as Fosterge LFS from Henkel Canada Ltd; cationic polyacrylate polymers such as Mafloc 764 from BASF Corp Special Chemicals; anionic polyacrylate polymers such as Mafloc 900 from BASF; potassium salt of complex n-stearyl amino acid such as Mafo 13 from BASF; polyethylene glycoldioleates and ditallates such as Pegosperse 600 and DOT, respectively from Lonza Inc.; polyorgano sulfonic acid such as Rheothik 80-11 from Henkel Corp; sodium salt of sulfonated naphthalene formaldehyde condensate such as Rhodacal N from Rhodia Inc; and other water soluble dispersing agents. In particular, the dispersing agent can be selected from a group consisting of hydroxy-ethylidene diphosphonic acid (Dequest 2010, available from Solutia in St. Loise, Mo. and sodium diisopropylnaphthalenesulfonate (Aerosol OS, available from Cytec Industries in West Paterson, N.J.

One advantage of the present method is that it is effective to remove flocculating materials at a both high and low concentration of dispersant solutions, and at a high and low pH. The following table summarizes the dispersant test for removing iron hydroxide floc from a filter.

TABLE 1

Dispersant Test

| Dispersant pH/Concentration | DEQUEST 2010 | AEROSOL OS |
| --- | --- | --- |
| PH 7.5, 10 ppm | Floc Break-up | Floc Break-up |
| PH 7.5, 100 ppm | Floc Break-up | No Floc Break-up |
| PH 2, 10 ppm | Floc Break-up | Floc Break-up |
| PH 2, 100 ppm | Floc Break-up | No Floc Break-up |

The above dispersant test shows that dispersant Dequest 2010 decreases the floc size to produce a smaller precipitate at pH 7.5. This effect is observed at a both high (100 ppm) and low (10 ppm) concentration of the dispersing agent. The Aerosol OS dispersant breaks-up the floc particles to a smaller precipitate at a low (10 ppm) concentration, but makes the floc larger at a higher (100 ppm) concentration.

The tests at pH 2 provides similar results. Again, both Dequest 2010 and Aerosol OS produce a smaller and slower settling floc at a low (10 ppm) concentration of the dispersing agent. At a higher concentration (100 ppm), Dequest 2010 yields a significantly smaller, slowing settling particles. Aerosol OS produces a larger and oily floc and the solution turns cloudy. Similar screening tests can be performed on any given wastewater solid flocs in order to determine the optimum pH and concentration and type of dispersing agents.

In one embodiment of the present invention, the dispersing agent is added in a mixture with an acid to produce a better result for removing inorganic clogged materials. The pH of the mixture can be in a range from 2 to 4. Sulfuric acid or a mixture of sulfuric and hydrochloric acid can be used. Most dispersing agents have a preferred pH range for best activity. This is due to the types of chemical groups and the molecular size of the dispersing agent, and the response of the materials being dispersed. Lower pH may help many dispersing agents since the low pH will help dissolve small amounts of precipitated compounds which help to weakly bind particles together. Once these binding compounds begin to dissolve, the dispersing agents can coat the particles and force them apart by means of their changed zeta potential.

In another embodiment of the present invention, the dispersing agent is added in a mixture with an oxidizing agent to produce a better result for removing an organic clogging materials. Such oxidizing agents include sodium hypochloride, sodium percarbonate, sodium perborate, sodium perphosphate, hydrogen peroxide, fenton reagent (hydrogen peroxide plus iron salts), clorates, perchlorates, chlorine dioxide, aqueous chlorine, permanganates, iodates, persulfates, bromates, ozone, and the like.

The method of the present invention may be practiced with any filtration or wastewater treatment system. Preferably the dispersing agent is mixed with water in the overflow section of the filtration unit. The solution is then backflushed or sucked back through the filters, as in a regular cleaning, but with the dispersing agent to help remove the clogging materials.

FIG. 1 is a flow chart illustrating the filter cleaning process according to the present invention. Waste water in the filter bank is routed to a backflush tank. A dispersing agent solution is added to the filter tank and the tank is then refilled with the water from the backflush tank. The filter tank sits for three hours to allow proper dispersion of clogged materials and cleaning of the filter. The cleaning process is complete and the water in the filtration tank is routed to a reaction tank for further treatment.

Figure 2:
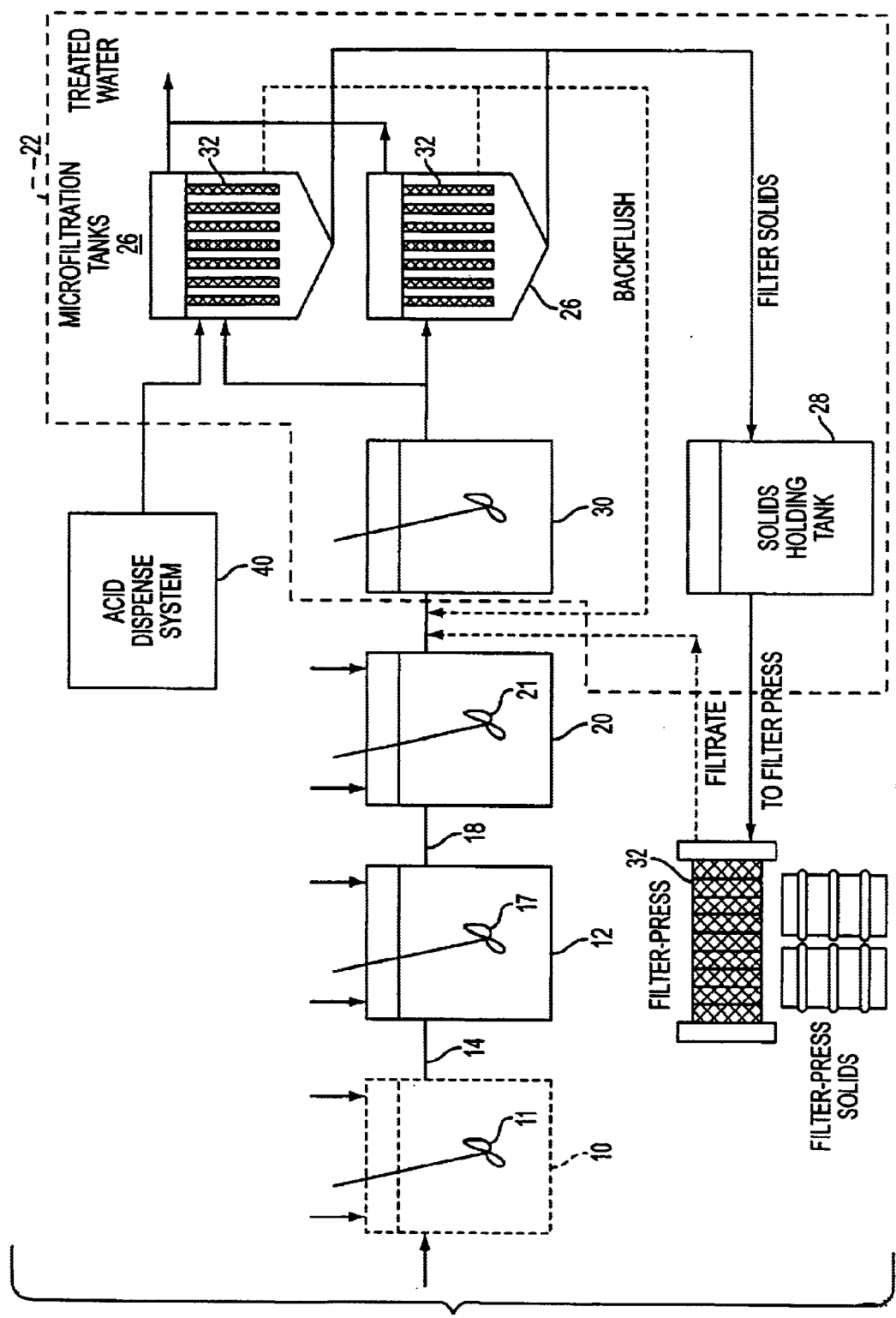
FIG. 2 is a schematic view of a filtration system carrying out the filter cleaning method of the present invention.

The present filter cleaning method can be used to clean filters in any filtration system. FIG. 2 is schematic view of a filtration system using the cleaning process of the present invention. The filtration system 22 in FIG. 2 comprises a membrane filtration system such as a microfiltration system described in greater detail in U.S. Pat. Nos. 5,871,648 and 5,904,853, the entire disclosures of which is hereby incorporated by reference. In this example, the filtration system includes two filter or microfiltration tanks 26 and a settling or sludge holding tank 28. A backflush tank 30 is placed prior to the filter tanks 26. The filter tank 26 is operated in two modes, namely, a filter tank operating mode and the filter tank backflush mode.

The filtration membrane 32 in the filter tank is generally in a tubular "sock" configuration. The membrane sock is placed over a slotted tube to prevent the sock from collapsing during use. The membrane material is commercially available from a variety of sources, and preferably has a pore size in the range of 0.5 to 10 microns, with a pore size of 1 micron being most preferred. Generally the filter tank 26 is equipped with an array of microfiltration membranes 32. In order to achieve high flow rates and flux values, a number of membranes or membrane modules, each containing a number of individual filter socks, may be used. The microfiltration membranes have a pore size in the range from 0.5 $\mu$m to 10 $\mu$m microns, and preferably from 0.5 $\mu$m to 1.0 $\mu$m. It has been found that the treated wastewater flow rate through 0.5 to 1 $\mu$m microfiltration membranes can be in the range from 200 GFD to 1500 GFD.

To clean the filters 32 installed in the filter tank 26, about one half of the wasterwater in the filter tank 26 is first routed to the backflush tank 30 through a delivery line. Another half of the waste water remains in filter tank 26. An acid solution containing dispersing agents is fed into the filter tank 26 through an acid disperse system 40. Sulfuric acid solution is used to lower the pH of the water to 2.0. Then, the water from backflush tank 30 is sent back to the filter tank 26 to refill the tank 26 to the top of the filters (but not above the top plate). The refill process for the filter tank takes about twenty minutes. Upon filling the filter tank 26, the filter tank 26 sits for three hours to ensure proper dispersing and cleaning. After about three hours, the water in the filter tank 26 is routed to a reaction tank 10 for further treatment. The cleaning process is completed and the filtration system is enabled to run under automatic conditions. The total acid cleaning cycle requires five hours of downtime per filter tank 26. However, this procedure will permit regular operation for the rest of the system during the filter cleaning.

Of particular advantage, the present invention directly addresses the root cause of the clogging problem, which is flocculated organic and inorganic materials clogged in the filter. The present filter cleaning method using dispersing agents improves the speed of cleaning as compared to overnight soaking used in the prior art technologies. Further, the present invention is much easier to use as the process can be effected in-situ in a single step, rather than in prior art methods in which the clogged filters are cleaned manually, chemically or physically, and then re-installed. Therefore the present filer cleaning method significantly reduces the downtime of the filtration system.

The foregoing description of specific embodiments and examples of the invention have been presented for the purpose of illustration and description, and although the invention has been illustrated by certain of the preceding examples, it is not to be construed as being limited thereby. They are not intended to be exhaustive or to limit the invention to the precise forms disclosed, and obviously many modifications, embodiments, and variations are possible in light of the above teaching. It is intended that the scope of the invention encompass the generic area as herein disclosed, and by the claims appended hereto and their equivalents.

What is claimed is:

1. A method of cleaning a microfiltration filter clogged with flocculated materials in a wastewater treatment system wherein wastewater is passed through the microfiltration filter in a filter tank and said flocculated materials clog the filter wherein the method comprises the steps of: adding a dispersing agent to a quantity of the wastewater wherein the dispersing agent is determined to break up flocculated materials into dispersed precipitates, cleaning the filter in said filter tank with smaller particles, soaking the filter in said wastewater and dispersing agent for a time to ensure dispersion of said precipitates and back flushing the filter to remove the dispersed precipitates from the filter.

2. The method of claim 1 wherein said flocculated materials clogging said filter comprises inorganic, organic or a mixture of inorganic and organic particles.

3. The method of claim 2 wherein said flocculated materials clogging said filter comprises CMP processing solids, alone or in combination with wastes, iron hydroxide or oxide, surfactants.

4. The method of claim 1 wherein said dispersing agent comprises a polyacrylic acid or a derivative of polyacrylic acid including acidic types, sodium salts, ammonium salts, and amine salts.

5. The method of claim 1 wherein said dispersing agent is selected from a group consisting of hydroxy-ethylidene diphosphonic acid, sodium diisopropylnaphthalenesulfonate, and water soluble dispersing agents.

6. The method of claim 5 wherein said dispersing agent is hydroxy-ethylidene diphosphonic acid.

7. The method of claim 1 wherein said dispersing agent is added at a concentration from 10 to 100 ppm.

8. The method of claim 1 wherein said dispersing agent is added in a mixture with an acid.

9. The method of claim 8 wherein said mixture has a pH from about 2 to 4.

10. The method of claim 1 wherein said dispersing agent is added in a mixture with an oxidizing agent.

11. A method of cleaning a microfiltration filter clogged with flocculated materials in a wastewater treatment system wherein wastewater is passed through the microfiltration filter in a filter tank and said flocculated materials clog the filter, wherein the method comprises the steps of: determining nature of said flocculated materials clogged on said filter; adding to a quantity of wastewater a dispersing agent suitable to break up said flocculated materials to form dispersed precipitates; cleaning the filter in said filter tank with said wastewater and dispersing agent for a time to ensure dispersion of said precipitates and back flushing the filter to remove the dispersed precipitates from the filter.

12. The method of claim 11 wherein said flocculated material is iron hydroxide or oxide and said dispersing agent is selected from a group consisting of hydroxy-ethylidene diphosphonic acid, sodium diisopropylnaphthalenesulfonate, and water soluble dispersing agents.

13. The method of claim 12 wherein said flocculated material is iron hydroxide or oxide and said dispersing agent is hydroxy-ethylidene diphosphonic acid.

14. The method of claim 11 wherein said dispersing agent is added at a concentration from 10 to 100 ppm.

15. The method of claim 11 wherein said dispersing agent is added at pH from about 2 to 4.

* * * * *